United States Patent Office 3,228,670
Patented Jan. 11, 1966

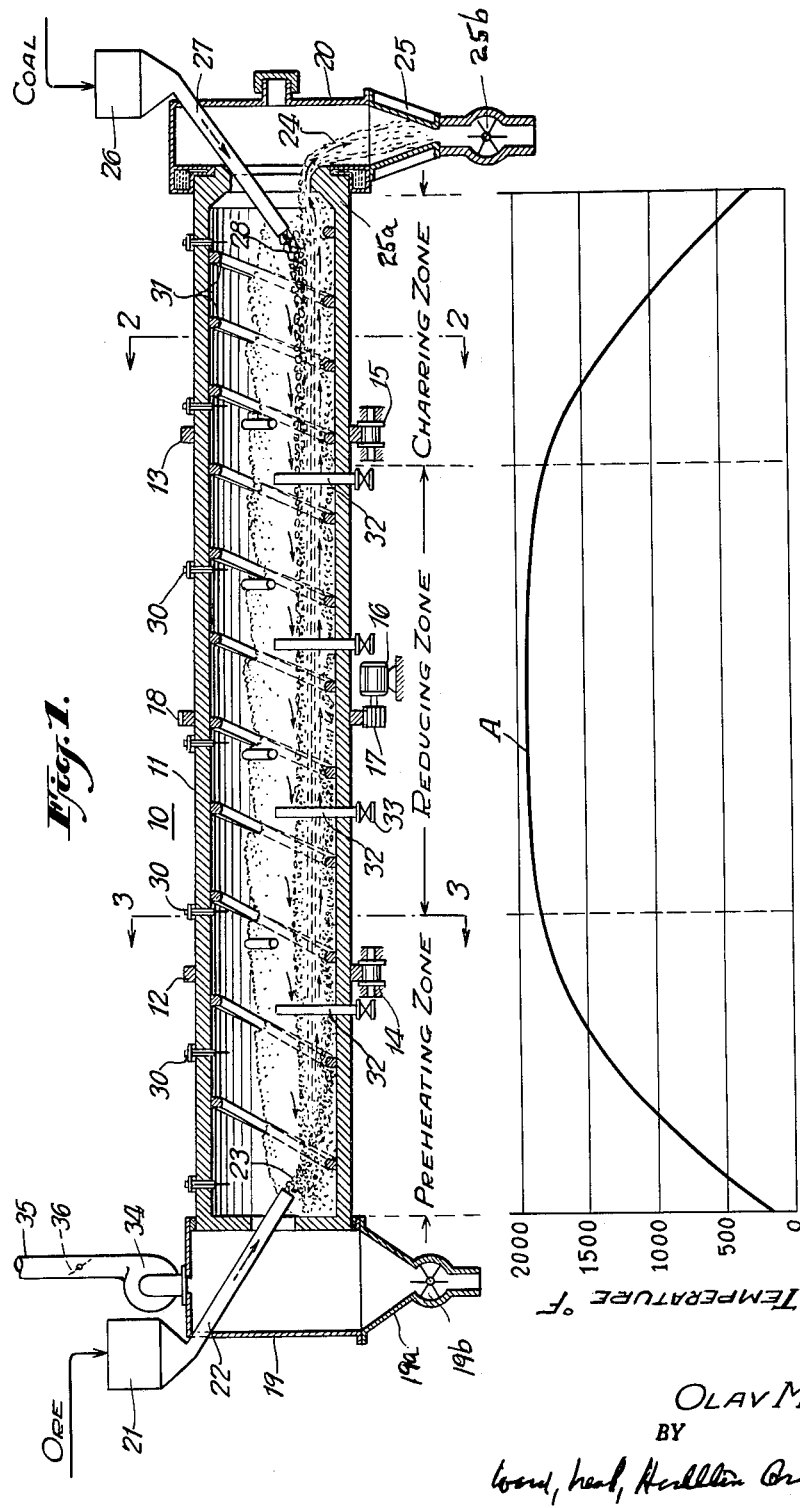

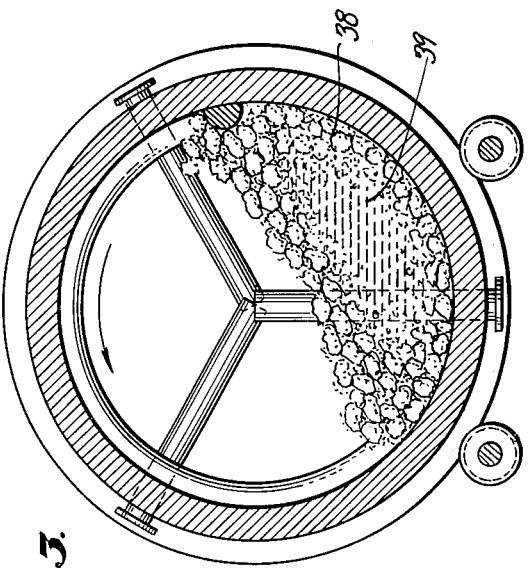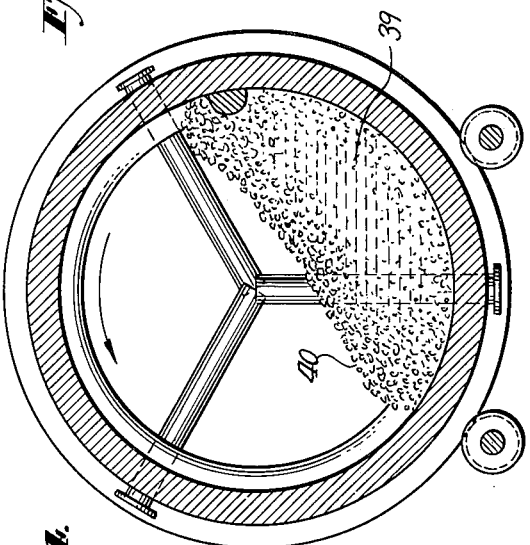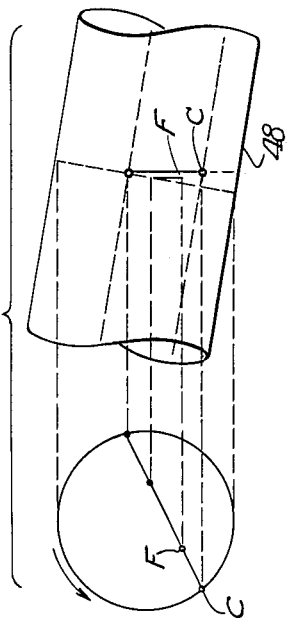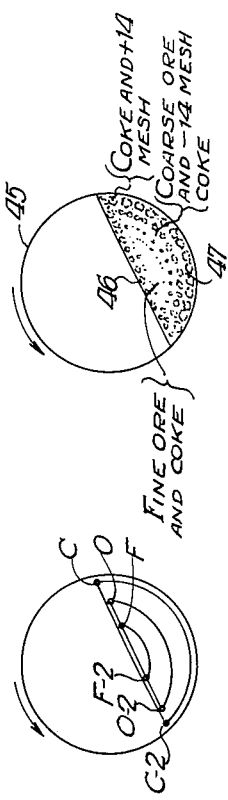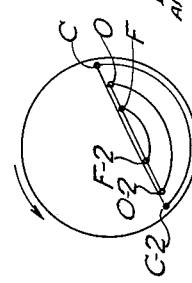

1

3,228,670
METHODS AND APPARATUS FOR ORE REDUCTION AND PROCESSING OF OTHER CHEMICALLY REACTIVE AGGREGATES
Olav Moklebust, Bayside, N.Y., assignor to R-N Corporation, New York, N.Y., a corporation of Delaware
Filed Jan. 23, 1963, Ser. No. 253,506
5 Claims. (Cl. 266—20)

This application is a continuation-in-part of my co-pending applications Serial No. 88,110, filed February 9, 1961, now Patent No. 3,113,859, and Serial No. 170,-698, filed February 2, 1962, now Patent No. 3,170,786.

This invention pertains in its broader aspects to improvements in methods and apparatus operating on the rotary kiln principle, which are of general application to the treatment of masses of crushed or granular materials of variable particle sizes and/or densities, as in the roasting or reduction of ores, calcining of limestone, production of cement, etc., for providing a more efficient operation or a more homogeneous product, or both, than heretofore.

The invention more especially pertains in one of its aspects to improvements in rotary kiln construction and operation, for controlling the rate of flow and also the direction of flow along the kiln, of the coarser and lighter particles as compared to the finer and denser particles, in a maner such in one adaptation that the rate of flow of the coarser and lighter particles may be retarded to a desired extent as compared to that the denser and finer particles, or alternatively, in a manner such in another adaptation, that the direction of flow of the coarser and lighter particles is reversed as compared to that of the finer and denser particles.

The invention finds especial application in one of its embodiments to the roary kiln reduction of oxidic ores, such as oxidic iron ores or other metal oxide-bearing materials, at temperatures below fusion, in the presence of hot combustible gases and a low volatile solid carbonaceous fuel, such as coke or the like, for retarding the rate of flow through the kiln of the relatively coarse coke particles, thereby minimizing or eliminating coke recovery and recycling operations.

The invention also finds application in another of its embodiments to the low temperature reduction of iron ores and the like, but utilizing a high volatile solid carbonaceous fuel, such as coal, as the solid reductant, and provides improved methods and apparatus therefor, wherein the physical heat values as well as the chemical heat values of the hot combustible gases and the hot char resulting from the charring of said reductant, are directly employed in reduction of the ore.

The invention will first be described with reference to its last-mentioned embodiment, and thereafter with reference to the other embodiments and applications of the invention above mentioned.

In processes as heretofore practiced using solid reducing agents for low temperature oxidic ore reduction, ore and a solid carbonaceous reductant, are usually mixed and heated up to reaction temperature. As the reaction temperatures are generally higher than the temperatures required for volatilization of the volatile matter contained in the reducing agent, these volatiles are usually lost to the process proper. Because the ore-carbon mixtures are heated up in counter-current, the volatile matter is distilled off at a temperature where its combustion is not needed and where its reducing power is not effective due to the low temperature. In these processes, therefore, the volatile matter can only be utilized outside the reactor, for instance, by combustion. Thus, most of the solid reductant processes prefer to use coke, coke breeze or low volatile anthracite rather than high volatile coals. However, in visualizing large commercial installations, the availability of low cost coke or coke breeze in sufficient quantities presents a series problem, whereas coal is widely available at a relatively low cost.

Coal may be employed as the immediately available source of the solid reductant, by charring the same, and concurrently reducing the ore in the presence of the hot combustible gases and optionally also the hot char resulting from the charring process. Alternatively, the hot char may be admixed with the wet recycle, low volatile, solid reductant, separated from the reduced ore product in continuous reduction processes, thereby to provide the necessary physical heat to dry the recycle reductant and supply a low volatile make-up char to offset that lost in the process. In this way the physical heat values of the hot char gas and char as well as the chemical heat values thereof are utilized in reducing the ore.

However, such coal charring processes as have heretofore been developed for integrated coal charring and ore reduction procedures in the manner aforesaid, require that the charring be done in apparatus outside the ore reduction furnace, in addition to which the heat necessary for the charring process is derived from heat values of the coal, thereby decreasing the heat value of the char gas and char. Also it is not always possible to utilize the physical heat of the hot char coming from the char unit when transferring the hot char to the reduction furnace. Processes of this type including the basic concept of integrated charring and ore reduction in the manner aforesaid are described in co-pending applications of R. P. Smith, Serial No. 74,185, filed December 6, 1960, and my application, Serial No. 80,296, filed January 3, 1961.

Although the inventions of the applications aforesaid provide technically sound and commercially effective integrated ore reduction and charring techniques, the present invention provides a basic simplification and improvement thereover, in that the charring is effected in the same furnace in which the ore is reduced, whereby a portion of the heat values generated in the ore reduction process which would otherwise pass from the furnace as waste heat, is utilized to preheat to the charring stage, the coal or other high volatile solid carbonaceous material employed as the solid reductant. Thus the full heat values of the hot char and hot char gases are utilized in reducing the ore in the reduction zone of the furnace.

In order to carry out the aforesaid ore reduction and charring steps as progressive and continuous operations in a single furnace, I employ a rotary kiln which preferably is a modification of the basic construction and operation described in my Patent No. 2,829,042. That is to say, I employ a rotary kiln having a downward slope on the order of about ½% up to about 3%, from what is normally its upper or its ore feed end towards its lower or normally its reduced ore discharge end. As in my said patent, the kiln is preferably provided with gas inlet tubes penetrating the walls of the kiln and extending substantially to the axis thereof, these tubes being provided with adjustable inlet valves, for allowing regulated amounts of oxygen-containing gases or secondary air to enter the kiln along its length.

In accordance with one embodiment of the present invention, however, the inside lining of the kiln is provided with helically extending ribs or screw vanes, which are so pitched in relation to the direction and speed of rotation of the kiln, as to transport the outer or peripheral, portions of the kiln load in counter-current to the remainder thereof. In this embodiment, the ore is fed progressively to the upper or feed end of the kiln and travels to the lower or discharge end, counter-current to the flow of gases in the kiln which are discharged through the stack at the feed end, the ore being thus heated up progressively to the reduction temperature. Coal or other high volatile solid carbonaceous reductant, is progressively fed into the lower end of the kiln. The pitch of the kiln screw vanes is so set in relation to the direction of kiln rotation, to move the outer rim of the kiln load in the opposite direction to the remainder thereof, and such as to move the coal fed into the lower or discharge end of the kiln toward its upper or feed end.

Tests show that by thus feeding coal to the ore, the sizes of 14 mesh and larger will segregate from the ore in the bed by rotation of the kiln and accumulate in a layer about the ore. The thickness of this layer depends on the amount of coal fed and on the diameter of the kiln. The more coal that is added, the thicker the layer and the larger the diameter of the kiln, the thicker the layer. Thus, the height of the screw vanes is determined by the diameter of the kiln, being proportional thereto. The evenness of the layer is dependent on the rotation speed of the kiln and on the percentage of loading.

Thus by rotation of the kiln the outer layer of coal is transported progressively from the discharge end of the kiln towards the feed end. The coal is heated up in counter-current by the hot reduced ore. The volatiles from the coal penetrate the ore layer and complete the reduction.

As the coal travels through the kiln, a certain amount of carbon is consumed and the size of the coke particles decreases. Fine ash particles and the fine coke particles gradually segregate from the outer layer, mix with the main ore layer and travel therewith towards the discharge end. The fine coke particles act as reductant.

Thus, the large coal particles travel from the kiln discharge end, being charred and giving off reducing and combustible gases. Then as the coal is transformed to char, the char particles become smaller due to consumption of carbon for reduction and removal of ashes which peel off the char particles as carbon is consumed. The fine ash particles segregate from the outer layer, mix with the ore and travel together with the reduced ore to the discharge end of the kiln.

Accordingly, by appropriately adjusting the quantity and size of the coal to the size of ore and consumption of carbon for any specific ore, the operation is adjusted to feed the coal to the kiln at the discharge end of the kiln, force it to travel in counter-current to the ore through the reduction zone. By the time the charred coal reaches the upper end of the reduction zone, the size of the char is so small that it mixes with the ore and travels together with it in the opposite direction through the reduction zone towards the kiln discharge end. In such case it is sufficient to extend the screw vanes only to this point in the kiln. If, for certain ores, a larger excess is needed, the screw vanes are extended to the upper or feed end of the kiln where the large char particles are discharged and re-used by recycling to the lower or discharge end of the kiln, or by feeding together with the ore into the upper kiln end after crushing.

The above described action is based on the principle which I have experimentally confirmed, that segregation occurs according to particle size and density when a load of an ore-coke mixture or the like containing particles of different sizes and/or densities, is tumbled continuously in a rotary kiln. The coarser particles as well as the lighter components, will migrate toward the periphery of the tumbled mass, while the finer and heavier components will migrate to the interior and concentrate thereat.

The particles of crushed coal fed into the kiln and the char particles produced therefrom being in general coarser and lighter than the ore particles, will migrate as a result of the tumbling action to the periphery of the load, to be transported by the screw vanes toward the feed end of the kiln while enveloping the central core of fines comprising the ore, ash and carbon fines admixture, which is concurrently flowing under gravity toward the discharge end of the kiln due to its downward slope in that direction.

In the absence of the screw vanes, the downward slope of the kiln produces a further phenomenon of significance to the first embodiment of the invention above mentioned, in that the rate of travel through the furnace is greater for the coarser and lighter particles than it is for the finer and heavier particles, due to the fact that the former are concentrated about the periphery of the load and also because they have a greater rolling action by virtue of their greater size. Thus, under the conditions above stated, the retention time in the kiln is much shorter for the coarser and lighter particles, than for heavier particles and fines.

As a consequence, in the prior art practice of ore reduction wherein an ore-coke mixture is fed into the feed end of a downwardly inclined rotary fliln having the conventional smooth walled interior, the coke particles being in general coarser and lighter than the ore, will travel through the furnace at such a relatively high rate that a substantial fraction is not utilized in reduction of the ore or as a protective ore sheath, thereby involving expensive recovery and recycling operations. This action may be overcome in accordance with a further modification of the invention, by providing the inner kiln wall with screw vanes, for retarding the rate of travel of the coarse material. In other instances it may be desirable while maintaining a selected retention time for the coarse material, to increase that for the fines. In such cases the coarser material can be appropriately retarded by the vanes, and the rotative speed of the kiln increased and/or the kiln slope adjusted, to give the same or a faster rate of travel for the fines. These various modifications are, of course, obtained by appropriate selection of the height and pitch of the screw vanes, in relation to the rotary speed and slope of the kiln.

The addition of the kiln screw vanes adapts the invention to other fields of utility than ore reduction, as for example in cement kilns, lime kilns, etc. These kilns are usually operated at a low percent of loading (10–15%) in order to obtain a homogeneous product and avoid the so-called "kidney effect" above described, i.e., the slow moving kidney-shaped core of fines in the kiln bed. By retarding the flow of coarse material in accordance with the above modifications of the invention and increasing the rotative speed of the kiln, higher kiln loads can be employed with resultant higher capacity and more homogeneous products.

Having thus described certain aspects of the invention in general terms, reference will now be had for a more detailed description of the above and other aspects, to the accompanying drawings, wherein:

FIG. 1 is a schematic showing, in axial sectional elevation through a rotary kiln in accordance with the above mentioned preferred embodiment of the invention as constructed and arranged for low temperature ore reduction; while FIG. 2 is a graphical showing of the temperature variation throughout the length of the kiln, under operating conditions of the ore reduction. FIGS. 3 and 4 are transverse sectional views taken at 2—2 and 3—3 of FIG. 1, illustrative of the texture and configuration of the kiln bed at these two locations of the kiln. FIGS. 5 and 6 are schematic showings, illustrative of the aforesaid segregation according to particle size and density, occurring when a mass of particles of various sizes and densities is tumbled in a rotary kiln; while FIG. 7 is a similar showing, illustrative of the relative rates of travel of such particles along the length of a sloping kiln, during rotation.

Referring to FIGS. 1–4, inclusive, the rotary kiln apparatus of the invention shown generally at 10, comprises an elongated tubular, cylindrical kiln 11, encircled by a pair of spaced bearing rings 12, 13, for rotatably supporting the kiln on rollers, journaled to fixed supports, as at 14, 15. The kiln is rotated by a motor 16, to the shaft of which is keyed a pinion 17, meshing with a ring gear 18, encircling the kiln.

The kiln 11 extends in downwardly sloping fashion, between a pair of stationary housings 19, 20, through the first of which the ore is fed from a hopper 21 and thence through chute 22 into the kiln as at 23; and into the second of which the reduced ore is progressively delivered, as at 24, over a dam formed by a constricted outlet for the kiln as at 25a and discharged thence to exterior of the housing through the discharge outlet 25, containing a star valve as at 25b for preventing escape of the furnace gases. The opposite housing 19, is provided with a similar discharge outlet 19a containing a star valve 19b for the same purpose. Crushed coal or other high volatile solid carbonaceous material is fed into the discharge end of the kiln from hopper 26 through chute 27, as at 28. The kiln is provided with thermocouples at spaced points therealong, as at 30, for observing the temperature control throughout the length of the kiln.

The kiln is provided on its interior surface with helically extending screw vanes, as at 31, and is further provided with gas inlet tubes, as at 32, which penetrate the wall of the kiln and extend substantially to the axis thereof. The exterior end of each tube has a valve 33, for regulating the opening of the tube, and suction of air or other gas through the tubes is furnished by an induced draft fan 34 in the stack 35 surmounting the housing 19. The draft is regulated by the valve or damper 36 in the stack. The kiln slopes downward from the feed end of the kiln towards the discharge end, as shown.

The direction of kiln rotation is opposite to the direction in which the kiln vanes 31 spiral between the upper and lower ends of the kiln, thereby to feed or tend to feed the particles deposited between the vanes or toward the upper end of the kiln. Thus referring to FIGS. 1–3, inclusive, if the kiln vanes 31 spiral in a counter-clockwise direction from the upper end toward the lower end of the kiln, the motor 16 should be arranged to drive the kiln in a clockwise direction, as viewed from the upper end of the kiln.

Ore alone or mixed with a small amount of fine sized char, is fed to the feed end of the kiln from hopper 21 through chute 22, and travels in counter-current to the kiln gases through three different zones in the kiln. The first zone is the "Preheating Zone," so labeled in the drawing, wherein the ore is preheated gradually to the reduction temperature, approximately 1800° F., as shown by the temperature graph A in FIG. 2. In the following or "Reduction Zone" of approximately 1800–1950° F., as shown in FIG. 2, the ore is reduced by the char segregating from the outer char layer and mixing with the ore. The major part of reduction is accomplished by the time the ore enters the "Charring Zone." In the charring zone the relatively coarse coal, which is fed through the discharge end of the kiln from hopper 26 via chute 27, is segregated from the ore as shown in FIG. 3, forming a layer 38 about the bed 39 of the reduced ore. The coal 38 is propelled by the vanes 31 in counter-current to the reduced ore, giving off the highly reducing volatiles as it becomes charred, which partly pass through the reduced ore bed causing more reduction.

As this reduction is gaseous, it is mildly exothermic as compared with solid char which is strongly exothermic. The gaseous reduction will also take place at a lower temperature than the reduction with solid char. The volatiles from the coal and the carbon monoxide formed by reduction in the kiln bed, are combusted progressively by air admitted to the kiln through the air tubes 32 mounted in the wall of the kiln. As shown in FIG. 3, the char 40 is reduced to a fine particle size by the time it is propelled to the feed end of the reducing zone and segregates to the ore thereat, being fed thence together with the ore to the discharge end of the kiln. The coal added to the charring zone, is preheated by the heat of the reduced ore. The temperature in the charring zone will then be progressively lower towards the discharge end of the kiln.

The temperature profile will be different for different ores and the optimum curve, corresponding to graph A of FIG. 2, is determined for each ore and also for the type of coal, its content of volatile matter and its charring temperature.

The integrated ore reduction and charring process above described has several very important advantages compared with prior reduction processes: Coal can be used directly in the reduction process. By moving the coal in counter-current to the hot ore, the heat of the ore is utilized for preheating and charring coal. The volatiles from the coal are used for gaseous reduction of the ore, for protection against reoxidation of the kiln bed surface and finally for progressive combustion above the kiln bed. Because the reducing agents, carbon and volatiles from the coal, move in counter-current to the ore to be reduced, the largest concentration of reducing agent will meet with the reduced ore in its most highly reduced stages. This will give more protection to the highly reduced ore and will insure a better utilization of the reducing agents. Thus a smaller excess of reducing agent is necessary by this counter-current method than by co-current methods.

The method described above foresees the use of relatively coarse coal and fine ore. As a further modification of the invention, both coal and ore may be screened into two sizes. The coarse fraction coal and the fine fraction ore, may then be treated according to the method described above. The fine coal fraction may be used with the coarse ore fraction in a kiln sloping downwardly from the discharge end towards the feed end. The coarse ore will be moved by the screw vanes from the feed end towards the discharge end. At the discharge end the fine coal will be added and moved towards the feed end due to the slope and rotation of the kiln.

Referring to FIG. 5 for a further explanation of the segregation action above described, when the kiln 45 is in rotation, as indicated by the arrow, the upper surface 46, of the load 47, in the kiln takes a position in the kiln corresponding to the angle of repose, and segregation will occur as indicated in the drawing. The individual particles will move along the paths as indicated in FIG. 6. When submerged in the bed, there is very little relative, individual movement of the particles. However, when the particles arrive at the surface they roll down the surface of the bed. The lighter and larger particles C will roll over the surface and land close to the kiln wall as at C–2. The coarse ore O will roll beneath the surface to O–2, and the fines will move beneath the surface from F to F–2. This action on the surface of the bed is similar to the action of material poured onto an inclined chute or to part of the action when tabling—and explains the segregation effect in the kiln bed.

The forward movement of the kiln bed in a smooth walled, inclined rotary kiln is illustrated by FIG. 7. Due to the inclination of the kiln 48 a light and coarse particle C in the periphery of the kiln bed, moves twice as far forward as a fine particle F in the middle of the kiln, and proportionately farther than any other particle in the kiln bed. This difference in rate of travel in forward direction tends to be even greater, because the coarser particles generally have a greater rolling action than finer particles. Thus the retention time in the kiln is much shorter for coarser and lighter particles than for heavier particles and fines. In metallurgical respects this is compensated somewhat by the fact that the coarse particles receive more heat due to their being closer to the bed surface and the heat source.

As a result of this faster rate of travel of the coarse coke particles than the ore fines through a rotary kiln of conventional design, an excess of coke is required to form a layer about the kiln load, to protect the same from the oxidizing influence of the kiln gases above the bed. This excess must of course be recovered and recycled which is expensive. By addition of the kiln screw vanes, however, the rate of travel of the coarse coke particles may be retarded to the extent that such excess coke addition is no longer required, and coke recycling and recovery operations thus minimized.

Ideally, the coarse coke envelope should thus be made to move through the kiln only at the rate it is abraded and consumed. Actually, very little of the coke shield is consumed by combustion when passing through the kiln. There is, however, a small amount of abrasion. The small abraded coke particles will segregate and go into the kiln bed and mix with the ore as reductant. This amount of abraded particles must be replaced by coarse coke. If the coarse coke is retarded by addition of the screw vanes, the relative amount of abraded coke will increase in approximate proportion to the increased retention time, and may thus be adjusted to the point wherein the necessary amount of fine coke in the kiln bed is produced by abrasion of the coarse coke shield, and only coarse coke, +14 mesh, added in the feed. The coke shield will accordingly move ahead only at the rate it is abraded. As a result, the amount of recycle coke is drastically reduced, with corresponding savings in physical carbon losses, heat for heating up the recycle coke and for evaporation of water, savings in capital cost. Optimally, the amount of coke discharged may thus be made so small as to eliminate the necessity for recycling.

It is evident that this method of retarding and adjusting the flow of coarse coke in the kiln is of general application to improving ore reduction processes previously known. For example, in one such process high-grade ore is mixed with coke and fed to a rotary kiln of conventional design. A large excess of coke and a high bed level are used to form a protective coke layer. No gas is used for heating. The necessary heat is supplied by blowing air or oxygen towards the protective layer for combustion of coke in the layer. In order to form a sufficiently thick layer a large excess of coke must be fed to the kiln if a high degree metallization in the production is desired. As has been shown above, a thick layer can be obtained by feeding much less coke and retarding the protective layer. When operating with a high-grade ore the heat balance for such process shows that it is theoretically possible to operate without additional heat from direct combustion of coke or burner gas. Theoretically the gases developed in the bed, by combustion thereof as they escape from the bed, give sufficient heat for the endothermic process in the bed. One reason why this is not accomplished practically, is the large amount of protective coke required to be recirculated, dried and reheated. However, by adjusting the coke sizing, the amount of coke, and the retardation of the protective layer in accordance with the present, the required amount of addition heat becomes negligible for a highgrade ore.

In accordance with a further embodiment of the invention, the charring of coarse coal may be carried out in a separate rotary kiln by means of the hot ore reduction kiln discharge. The latter will be discharged from the kiln into a rotary, refractory lined kiln supplied with screw vanes or spirals. Coarse coal will be fed counter-current to the hot kiln discharge and be charred gradually as it moves towards the upper discharge end. The char gases will go directly into the reduction kiln. For regulation of the temperature in the upper part of the charring kiln, air tubes operating on the reduction kiln draft may be used. The coarse char discharge at the upper end will be discharged via an air-sealed bin in a hot state and can be mixed with recycle coke or fed directly to the reduction kiln with or without prior crushing. The reduced ore traveling through the char kiln will be cooled and can be discharged into another cooler for final cooling or quenched in water.

What is claimed is:

1. Rotary kiln apparatus, comprising: a tubular kiln of substantially cylindrical contour, means rotatably mounting said kiln in axially inclined relation to the horizontal, a refractory lining in said kiln having upstanding, axially spaced, helical ribs but being otherwise of substantially cylindrical contour, said ribs extending from the lower end of said kiln for at least a portion of the distance to the opposite end thereof, a pair of stationary housings enclosing the opposite ends of said kiln, respectively, conveying means in each said housing for feeding loose aggregate materials into the opposite ends of said kiln, discharge means in at least the lower said housing for discharging loose aggregrate materials delivered from said kiln, stack and blower means surmounting the upper said housing for inducing a draft in said kiln, and means for continuously rotating said kiln in a direction so related to the spiraling direction of said helical ribs as to tend to feed toward the upper end of said kiln the aggregate material fed into the lower end thereof.

2. Rotary kiln apparatus, comprising a tubular kiln of cylindrical contour and of substantially uniform diameter throughout, means rotatably mounting the same in axially inclined relation to the horizontal, for rotation about its axis, the interior wall of said kiln being formed with helically extending, axially spaced, upstanding ribs, a stationary housing enclosing each end of said kiln, conveying means in at least one said housing for conveying loose aggregate materials of variable particle size into said kiln, discharge means in the opposite said housing for discharging loose aggregate materials delivered from said kiln, means for continuously rotating said kiln at a speed such as to segregate said aggregate materials according to particle size and density, and in a direction such in relation to the spiraling direction of said helical ribs, as to retard the rate of feed toward the lower end of said kiln, of the coarser and denser particles of said aggregate deposited between said ribs.

3. Rotary kiln apparatus, comprising a tubular kiln of substantially cylindrical contour and of substantially uniform internal diameter throughout, means rotatably mounting said kiln in axially inclined relation to the horizontal, a refractory lining in said kiln having formed thereon, upstanding helical ribs but being otherwise of substantially cylindrical contour, said ribs extending from the lower end of said kiln for at least a portion of the distance to the opposite end thereof, a pair of stationary housings enclosing the opposite ends of said kiln, respectively, conveying means in each said housing for feeding loose aggregate materials into the opposite ends of said kiln, discharge means in the lower said housing for discharging loose aggregate materials delivered from said kiln, stack and blower means surmounting the upper said housing for inducing a draft into said kiln, and means for continuously rotating said kiln in a direction such in relation to the spiraling direction of said helical ribs such as to feed toward the upper end of said kiln, particles of said aggregate materials deposited between said ribs.

4. Rotary kiln apparatus, comprising a tubular kiln of substantially cylindrical contour and of substantially uniform diameter throughout, means rotatably mounting said kiln in axially inclined relation to the horizontal, means for rotatably driving the same, a refractory lining in said kiln having formed thereon, upstanding helical ribs but being otherwise of substantially cylindrical contour, said ribs extending from one end of said kiln for at least a portion of the distance to the opposite end thereof, a pair of stationary housings enclosing the opposite ends of said kiln, respectively, conveying means in each said housing for feeding loose aggregate materials into the opposite ends of said kiln, and discharge means in at least one said housing for discharging loose aggregate materials delivered from said kiln, a series of air tubes spaced along and about said kiln and extending from the exterior to the axis thereof, said tubes being provided exterior to said kiln with adjustable air valves for regulating the flow of air therethrough, and stack and blower means surmounting at least one said housing for inducing a draft in said kiln.

5. Rotary kiln apparatus, comprising a tubular kiln of substantially cylindrical contour and of substantially uniform internal diameter throughout, means rotatably mounting said kiln in axially sloping relation to the horizontal, a refractory lining in said kiln having formed thereon, upstanding helical, axially spaced ribs but being otherwise of substantially cylindrical contour, said ribs extending from one end of said kiln for at least a portion of the distance to the opposite end thereof, a pair of stationary housings enclosing the opposite ends of said kiln, respectively, and conveying means in at least one said housing for feeding loose aggregate materials into said kiln, and discharge means in at least the opposite said housing for discharging loose aggregate materials delivered from said kiln, a stack surmounting one said housing, having blower and damper means therein, a series of tubes spaced along and about said kiln and extending from the exterior substantially to the axis thereof, said tubes being provided exterior to said kiln with adjustable valves, and means for continuously rotating said kiln in a direction such in relation to the spiraling direction of said helical ribs as to tend to feed toward the upper end of said kiln particles of said aggregate materials deposited between said ribs.

References Cited by the Examiner

UNITED STATES PATENTS

| | | | |
|---|---|---|---|
| 1,751,127 | 3/1930 | Cantieny | 34—128 |
| 2,047,562 | 7/1936 | Johannsen | 75—36 X |
| 2,252,279 | 8/1941 | Zirngibl et al. | 23—279 X |
| 2,664,389 | 12/1953 | Rex et al. | 202—131 X |
| 2,829,042 | 4/1958 | Moklebust | 75—36 |
| 2,924,513 | 2/1960 | Altimier et al. | 23—279 |
| 2,983,378 | 5/1961 | Hilkermeier | 209—452 X |

FOREIGN PATENTS 882,324  11/1961  Great Britain.

JOHN F. CAMPBELL, *Primary Examiner.*

JAMES H. TAYMAN, Jr., MORRIS O. WOLK,
*Examiners.*